United States Patent
Crawford et al.

(10) Patent No.: US 10,558,532 B2
(45) Date of Patent: Feb. 11, 2020

(54) RECOVERING FROM A MISTAKEN POINT-IN-TIME COPY RESTORE

(71) Applicant: INTERNATIONAL BUSINESS MACHINES CORPORATION, Armonk, NY (US)

(72) Inventors: Joshua J. Crawford, Tucson, AZ (US); Paul A. Jennas, II, Tucson, AZ (US); Jason L. Peipelman, Austin, TX (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 15/807,775

(22) Filed: Nov. 9, 2017

(65) Prior Publication Data
US 2019/0138404 A1 May 9, 2019

(51) Int. Cl.
*G06F 11/00* (2006.01)
*G06F 11/14* (2006.01)

(52) U.S. Cl.
CPC ...... *G06F 11/1469* (2013.01); *G06F 11/1458* (2013.01); *G06F 11/1474* (2013.01); *G06F 2201/805* (2013.01); *G06F 2201/82* (2013.01)

(58) Field of Classification Search
CPC ............. G06F 11/1469; G06F 11/1458; G06F 11/1474
See application file for complete search history.

(56) References Cited

U.S. PATENT DOCUMENTS

| | | | | |
|---|---|---|---|---|
| 6,185,577 B1* | 2/2001 | Nainani | ............... | G06F 11/1471 |
| 7,124,323 B2 | 10/2006 | Sanchez et al. | | |
| 7,231,544 B2 | 6/2007 | Tan et al. | | |
| 7,895,528 B2 | 2/2011 | Keohane et al. | | |
| 8,005,800 B2 | 8/2011 | Spear et al. | | |
| 8,688,936 B2 | 4/2014 | Agombar et al. | | |
| 8,918,606 B1* | 12/2014 | Stringham | .......... | G06F 12/0223 |
| | | | | 711/162 |
| 9,558,072 B1* | 1/2017 | Mam | ................... | G06F 11/1451 |
| 2004/0260895 A1* | 12/2004 | Werner | ............... | G06F 11/2082 |
| | | | | 711/162 |
| 2012/0084523 A1* | 4/2012 | Littlefield | ........... | G06F 11/1469 |
| | | | | 711/162 |
| 2014/0344526 A1* | 11/2014 | Brown | ................ | G06F 11/1458 |
| | | | | 711/141 |

OTHER PUBLICATIONS

Lascon Storage, "Flashcopy From IBM", Snapshots | IBM FlashCopy, http://www.lascon.co.uk/snap-flashcopy.php, Accessed on Oct. 27, 2017, 8 pages.

(Continued)

*Primary Examiner* — Philip Guyton
(74) *Attorney, Agent, or Firm* — Teddi E. Maranzano (57) ABSTRACT

A method, system, and program product are provided for undoing a point-in-time copy restore. Provided are swapping corresponding tracks between a source volume and a target volume using cache of a storage subsystem to which the source and the target volumes are attached, based on an indicator being set that a track on the source volume is changed since a point-in-time copy. Tracks are moved from the source volume to the target volume based on the indicator being unset.

17 Claims, 6 Drawing Sheets

(56) References Cited

OTHER PUBLICATIONS

IBM Knowledge Center, "Recovering a copy pool using fast reverse restore", https://www.ibm.com/support/knowledgecenter/en/SSLTBW_2.2.0/com.ibm.zos.v2r2.arcf000/recvcpfrr.htm, Accessed on Aug. 29, 2017, 2 pages.

IBM Knowledge Center, "Recovering with FlashCopy image copies", DB2 10—Utilities—Recovering with FlashCopy image copies, https://www.ibm.com/support/knowledgecenter/en/SSEPEK_10.0.0/ugref/src/tpc/db2z_recoverutilflashcopy.html, Accessed on Aug. 29, 2017, 3 pages.

CA Technologies, "Restoring Objects from Image Copy and FlashCopy Backup", https://docops.ca.com/ca-fast-recover-for-db2-for-z-os/19-0/en/using/restoring-objects-from-image-copy-and-flashcopy-backup/, Last update Jan. 5, 2015, 2 pages.

IBM Knowledge Center, "Reverse FlashCopy", https://www.ibm.com/support/knowledgecenter/en/HW213_7.2_0/com.ibm.storage.ssic.help.doc/f2c_flashrevrelselcopyopt_1n3jhc.html, Accessed on Aug. 29, 2017, 2 pages.

IBM Knowledge Center, "Reverse FlashCopy relationships", https://www.ibm.com/support/knowledgecenter/ST5GLJ_8.1.0/com.ibm.storage.ssic.help.doc/f2c_fcreverse_1m7m11.html, Accessed on Aug. 29, 2017, 2 pages.

\* cited by examiner

Figure 1

Volume A 200              Volume B 210

Data from time X (Point-in-time copy Establish) ← 220

Data from time Y (Point-in-time copy Restore) ← 230

RECOVERING FROM A MISTAKEN POINT-IN-TIME COPY RESTORE

BACKGROUND

The present disclosure relates generally to the field of computer storage, and more particularly to recovering from an unintentional or mistaken point-in-time copy restore.

Enterprise-level storage systems implement technology to enable point-in-time copies of storage volumes, with the storage remaining available during the copy process. The copy can be used for data backup, or development and testing, among other uses. Restoring a volume using a point-in-time copy requires care because the data on the volume to be restored will be overwritten. Using the wrong point-in-time copy can produce unexpected results. Recovering from such an error is time consuming and may extend the unavailability of a system.

SUMMARY

Embodiments of the present invention disclose a method, program product, and system for undoing a point-in-time copy restore. Corresponding tracks are swapped between a source volume and a target volume using cache of a storage subsystem to which the source and the target volumes are attached, based on an indicator being set that a track on the source volume is changed since a point-in-time copy. Tracks are moved from the source volume to the target volume based on the indicator being unset.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

The present disclosure relates generally to the field of computer storage, and in particular to recovering from an unintentional or mistaken point-in-time copy restore. Enterprise-level storage systems implement technology for creating point-in-time copies of active, i.e., source, volumes, while the source volumes are actively being accessed by an application or operating system. The point-in-time copy (Copy) can be created for an entire storage volume, one or more datasets, or for selected of tracks. The Copy can be used for data backup, or development and testing, among other uses.

In current practice, if a failure affects a source volume, either as a result of a hardware failure or application error, an administrator may restore the source volume using the Copy. However, restoring the source volume this way will overwrite any changes to the data on the source, resulting in a loss of transactions or other work performed since the Copy was created. One popular workaround is for an administrator to manually create a third volume to hold the source volume. The administrator then initiates a Copy process from the source volume to the third volume. Data is not actually copied at this time. The process creates a checkpoint of the source volume at the point-in-time. The process also creates a change recording bitmap, which is a mapping between the source volume and third volume. The administrator then initiates a background copy process of the source volume to the third volume. The change recording bitmap is updated as each track is copied to the third volume. The restore process of the source volume cannot continue until the Copy to the third volume completes. Then the administrator can re-establish the Copy relationship between the source volume and the original target volume and restore the target volume onto the source volume. Finally, the changes captured on the third volume can be applied to the source volume. During this process, applications that depend on the data on the source volume are not available.

Factors, including the amount of data, number of volumes, and speed and reliability of the network affect how long the data restore will take. Human error can further complicate and delay the recovery process, for example, for example if the administrator initiates a restore process using an incorrect volume. Embodiments of the present invention provide a restore of a source volume from a target volume, including the data written since the Copy, without an additional intermediate (i.e., third) volume. Embodiments also provide the ability to undo the restore of a source volume where human error causes the wrong volume(s) to be restored.

Figure 1:
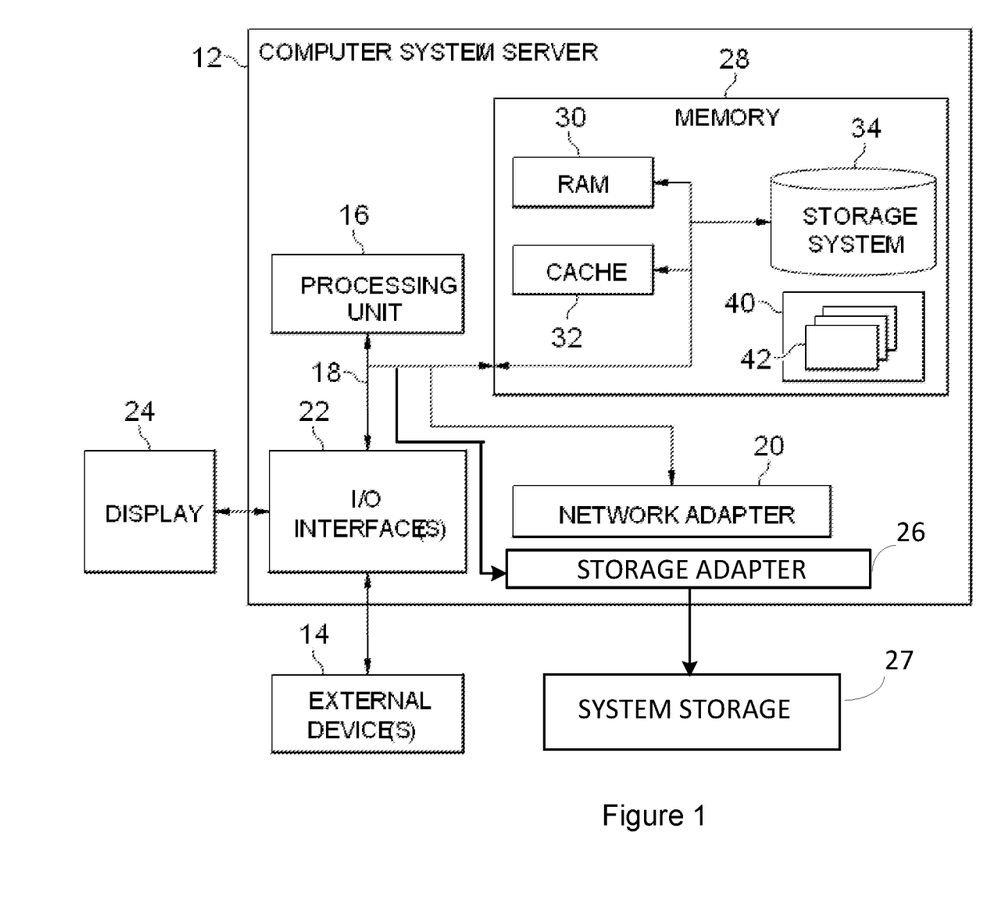
FIG. 1 illustrates a high-level block diagram of an example computer system that may be used in implementing one or more of the methods, tools, and modules, and any related functions, described herein, in accordance with embodiments of the present disclosure.

Turning now to the figures, FIG. 1, illustrates a computer system/server 12 which is applicable to implement the embodiments of the present invention. Computer system/server 12 is only illustrative and is not intended to suggest any limitation as to the scope of use or functionality of embodiments of the invention described herein.

The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that, although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Computer system/server 12 includes a storage adapter 26 for attaching system storage 27. The system storage 27 includes, but is not limited to, Network Attached Storage, Direct Attached Storage, and Storage Area Network. The system storage 27 typically includes a storage controller (not shown) having one or more embedded processors, memory, and cache. A storage controller can be understood to be a specialized implementation of a computer, such as the computer system/server 12. A specialized operating system, firmware, or other software configures the processor to enable the controller to cause the disks of the system storage 27 to perform various embodiments of the present invention.

As a program/utility 40 requests to read and/or write data stored on system storage 27, the requested data may be held in the controller cache for improved performance. The cache can also hold a change recording bitmap. The controller software maintains the change recording bitmap and sets a bit corresponding to a track of data that is changed and requires a flush operation from the cache to the system storage 27. Similarly, as part of the Copy operation, as each track is processed, the controller software resets the bit corresponding to the processed track, indicating that the Copy operation for the track is complete.

It is noted that FIG. 1 is intended to depict the representative major components of an exemplary computer system 100. In some embodiments, however, individual components may have greater or lesser complexity than as represented in FIG. 1, components other than or in addition to those shown in FIG. 1 may be present, and the number, type, and configuration of such components may vary.

Figure 2:
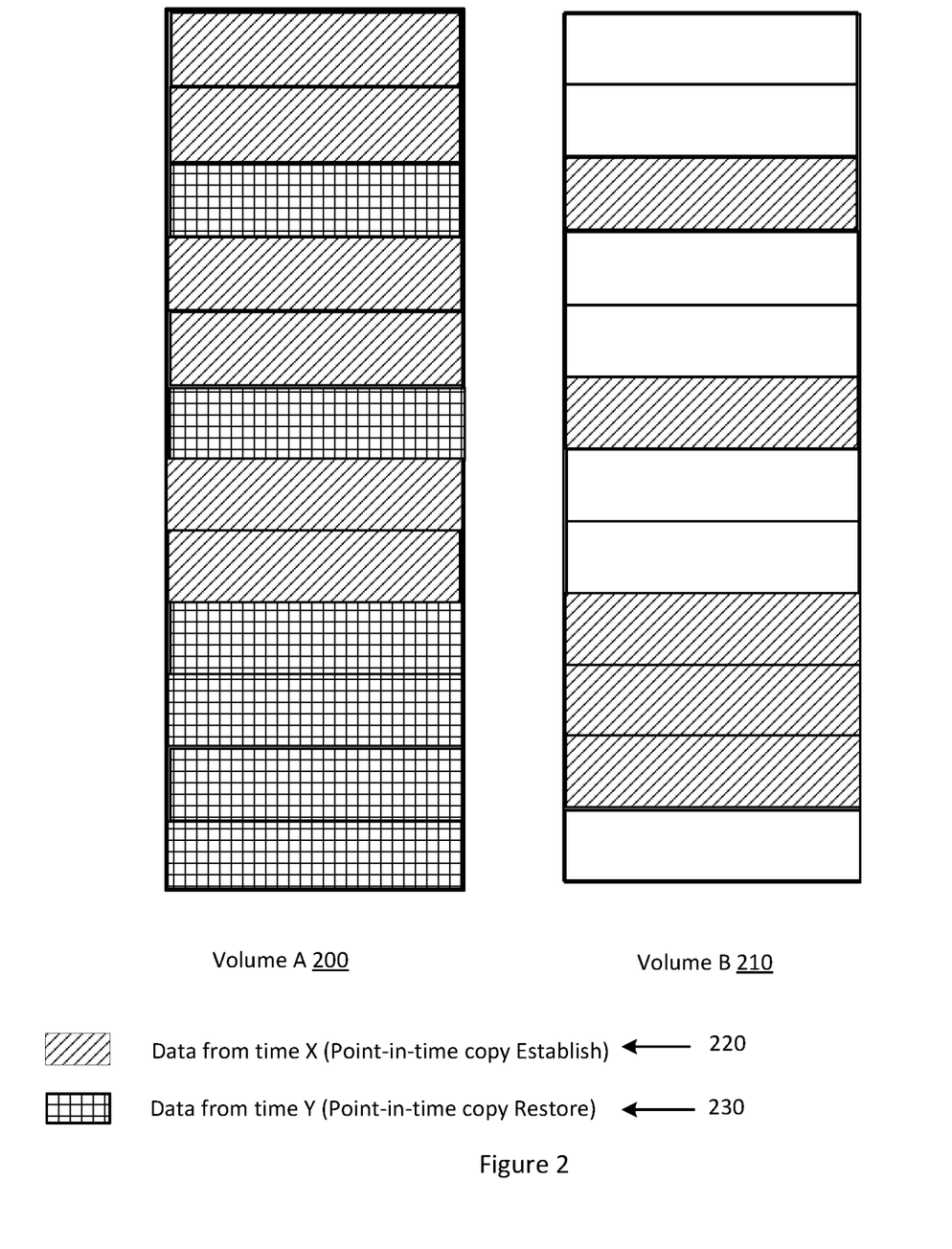
FIG. 2 illustrates the state of two volumes at the beginning of a volume restore, in accordance with embodiments of the present disclosure.

FIG. 2 illustrates the state of two volumes at the beginning of a volume restore, i.e., time Y (i.e., the point of the Copy restore). Label 220 represents tracks on source Volume A 200 that are unchanged since the Copy was established at time X (i.e., the point when the Copy is established). Label 230 represents tracks on source Volume A 200 that have changed since time X. As shown, Volume A 200 includes a mix of both unchanged (220) and changed (230) tracks. Prior to changing tracks on Volume A 200, the unchanged track (220) is written to the corresponding track on the target Volume B 210 and the changes (230) are written to the track on source Volume A 200. The bit is set in the change recording bitmap of Volume A 200 corresponding to the changed track, indicating the track is changed.

Figure 2A:
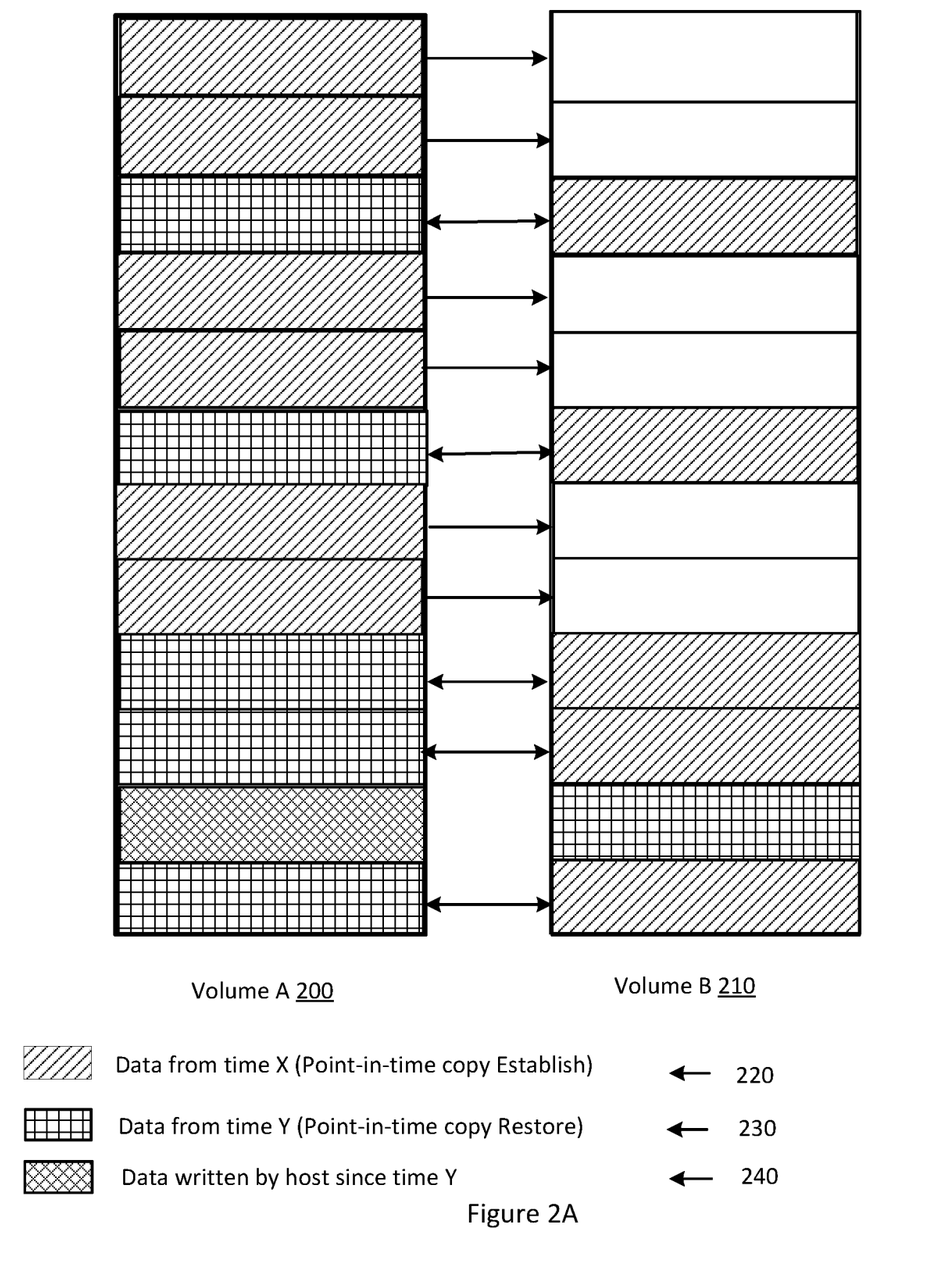
FIG. 2A illustrates the restore process, in accordance with embodiments of the present disclosure.

FIG. 2A illustrates the state change of the tracks on source Volume A 200 and target Volume B 210 as a result of the restore process using the Copy. Labels 220 and 230 function essentially the same as those described with reference to FIG. 2. Hosts that are accessing source Volume A 200 can continue to read and/or write data during the restore process. Label 240 illustrates the case where a host issues a write operation to a track on source Volume A 200 during the restore process. As in FIG. 2, the unchanged track (220) is written to the target Volume B 210 and the changes (230) are written to the track on source Volume A 200. The bit is set in the change recording bitmap of Volume A 200 corresponding to the changed track. After the unchanged track (220) is successfully written to the target Volume B 210, the changed track 230 is written to the source Volume A 200. Then, the additional change (240) from the host write operation is written to the track on the source Volume A 200.

It should be noted that in current practice, the end result of a restore using a Copy results in both the source and target volumes having the same data, because the source volume is overwritten by data from the Copy. In contrast, when executed, various embodiments of the present invention preserve the state of the volumes as of the execution of the restore process. This allows the Copy restore operation to be reversed to the state shown in FIG. 2 prior to the execution of the restore operation, for example, if an incorrect volume is used for the restore operation.

Figure 3:
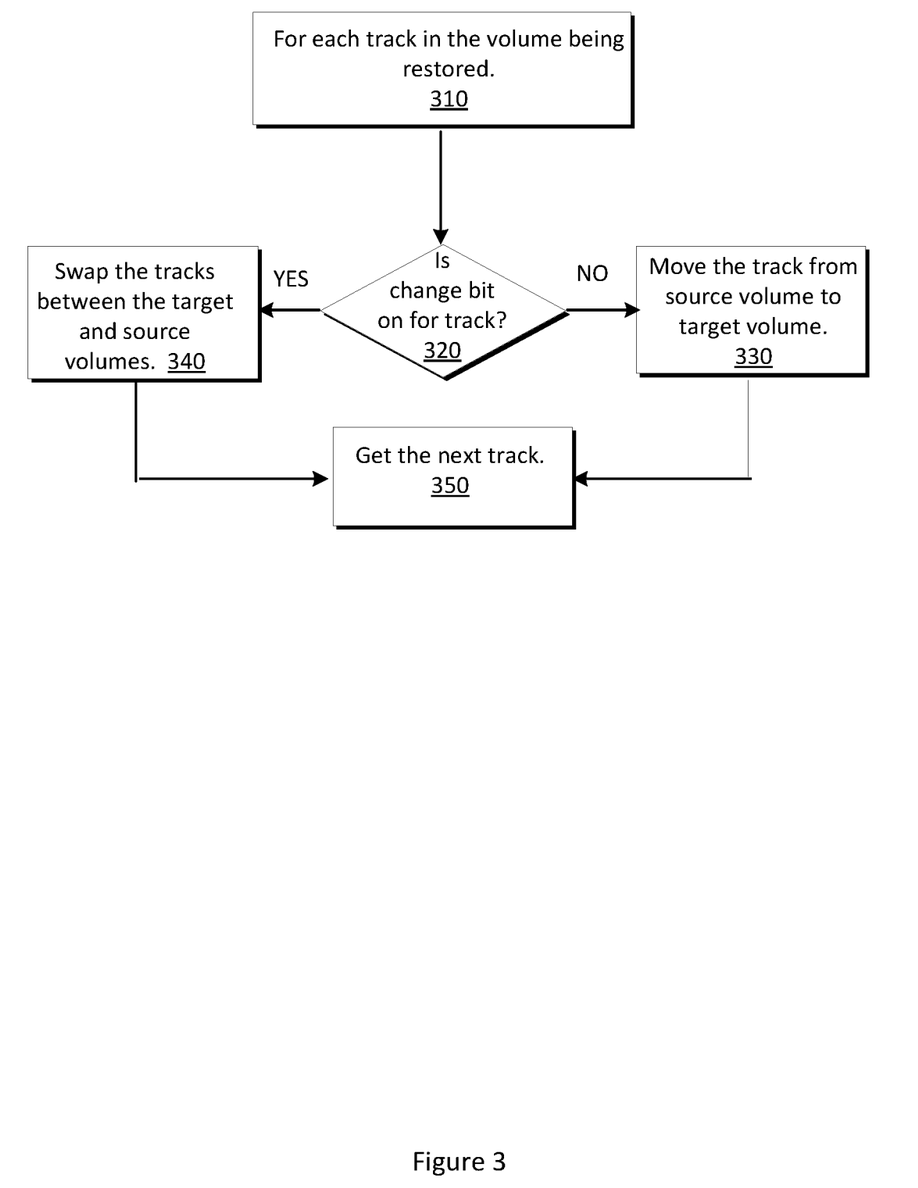
FIG. 3 depicts an exemplary embodiment of a background restore process from a point-in-time copy, in accordance with embodiments of the present disclosure.

FIG. 3 illustrates a background restore process from a Copy. When restoring data from the target Volume B 210 back to the source Volume A 200, a swap is done such that the data from the source Volume A 200 at the time of the restore is moved to the target Volume B 210. The swap of tracks can be performed in the cache of the storage subsystem. The data in the source Volume A 200 is then updated as normal. All the data from the source Volume A 200 that has not yet been transferred to the target Volume B 210 will be copied from the source Volume A 200 to the target Volume B 210.

At 310, the restore begins and each track in the source Volume A 200 is processed. The restore process checks to see if the change recording bit is on for the track being processed (320). The change recording bitmap contains a bit for each track on the volume. A bit set, or on, indicates the track corresponding to the bit location in the map has been changed since the creation of the Copy. If the bit is set, at 340 the tracks are swapped between the source Volume A 200 and the target Volume B 210. The process continues at 350 with the next track. Returning to 320, if the bit is not set for the track being evaluated, then the track from the source Volume A 200 is copied to the target Volume B 210. The process continues at 350 with the next track until all tracks are processed.

Figure 4:
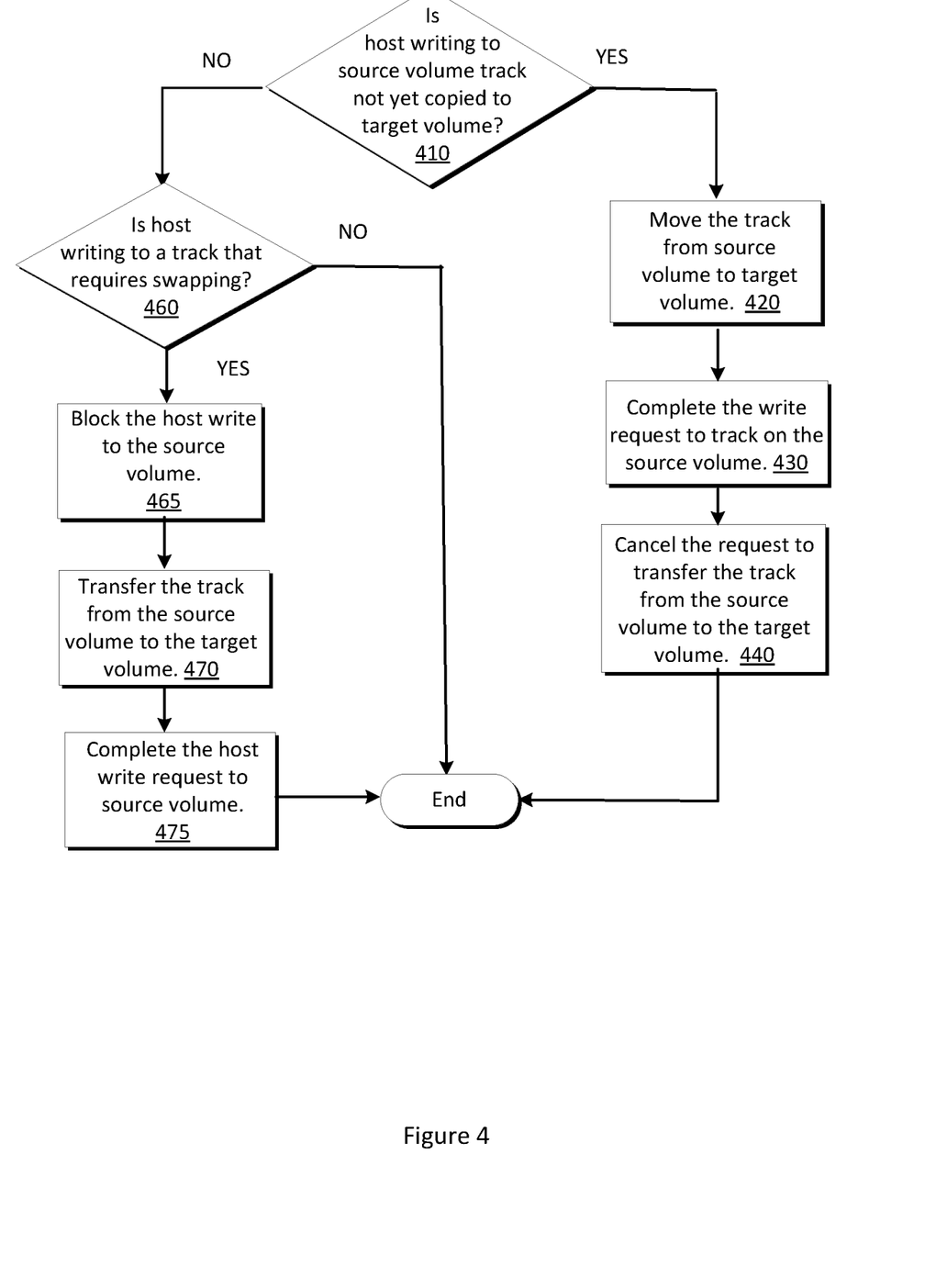
FIG. 4 depicts an exemplary embodiment of processing host write operations during the recovery process of FIG. 3, in accordance with embodiments of the present disclosure.

FIG. 4 illustrates processing host write operations during the recovery process of FIG. 3. In current practice, if a host is writing to the source Volume A 200, the write operation is processed normally and the restore transfer of the track from the target Volume B 210 is canceled. In the embodiment of FIG. 4, if the host is writing to a track not yet copied to the target Volume B 210, (data from time X), the restore process executes a copy on write by moving the track from the source Volume A 200 to the target Volume B 210, and then completing the host write operation on the source Volume A 200. The transfer from source Volume A 200 to the target Volume B 210 is canceled. If the host is writing to a track that requires swapping (data from time Y), the write is blocked. The track is transferred from the source Volume A 200 to the target Volume B 210. Finally, the host write operation to the source Volume A 200 is completed. The host and the restore process synchronizes access to the same track using the lock on track access. If one process has the track lock, and the other process wants track access, then the requesting process is queued until the process having the track access completes. Write operations during the restore process are recorded in the change recording bitmap in the same manner as during a normal Copy operation. The restore process does not affect the contents of the change recording bitmap. However, after the restore completes, the change recording bitmap is discarded.

At 410, the restore process determines whether the host is writing to a track on the source Volume 200 that has not yet been copied to the target Volume 210. If not, then at 460, the process determines whether the host is writing to a track that requires swapping. If so, then at 465 the restore process blocks the host write operation to the source Volume 200. The track is transferred from the source Volume 200 to the target Volume 210 at 470. The host write operation is completed to the source Volume 200 at 475. Returning to 410, if the host is writing to a source Volume 200 track that has not yet been copied to the target Volume 210, then the restore process moves the track from the source Volume 200 to the target Volume 210 at 420. The write request to the track on the source Volume 200 is completed (430). The request to transfer the track from the source Volume 200 to the target Volume 210 is canceled. (440).

At the end of the restore process all tracks in the source Volume A 200 represent the data from time X, and may include data written by the host since the initiation of the restore. All tracks in the target Volume B 210 represent the data from the source Volume A 200 at time Y.

It is possible to recover from an error discovered during or after the restore process of FIG. 3 or 4, for example if the wrong volumes are being restored. Once the restore in error is completed, a system administrator can issue a command, for example through a system management interface, to swap the volume identifiers of the source Volume A 200 and the target Volume B 210. Volume B 210 will now appear to the host to be the source Volume A 200 at time Y, which is the point when the restore was performed. However, any host writes done to the source Volume A 200 during the restore process will be lost. The volume identifiers can be swapped again, and as a result, the source Volume A 200 will have the data as of the point when the restore was undone.

Figure 5:
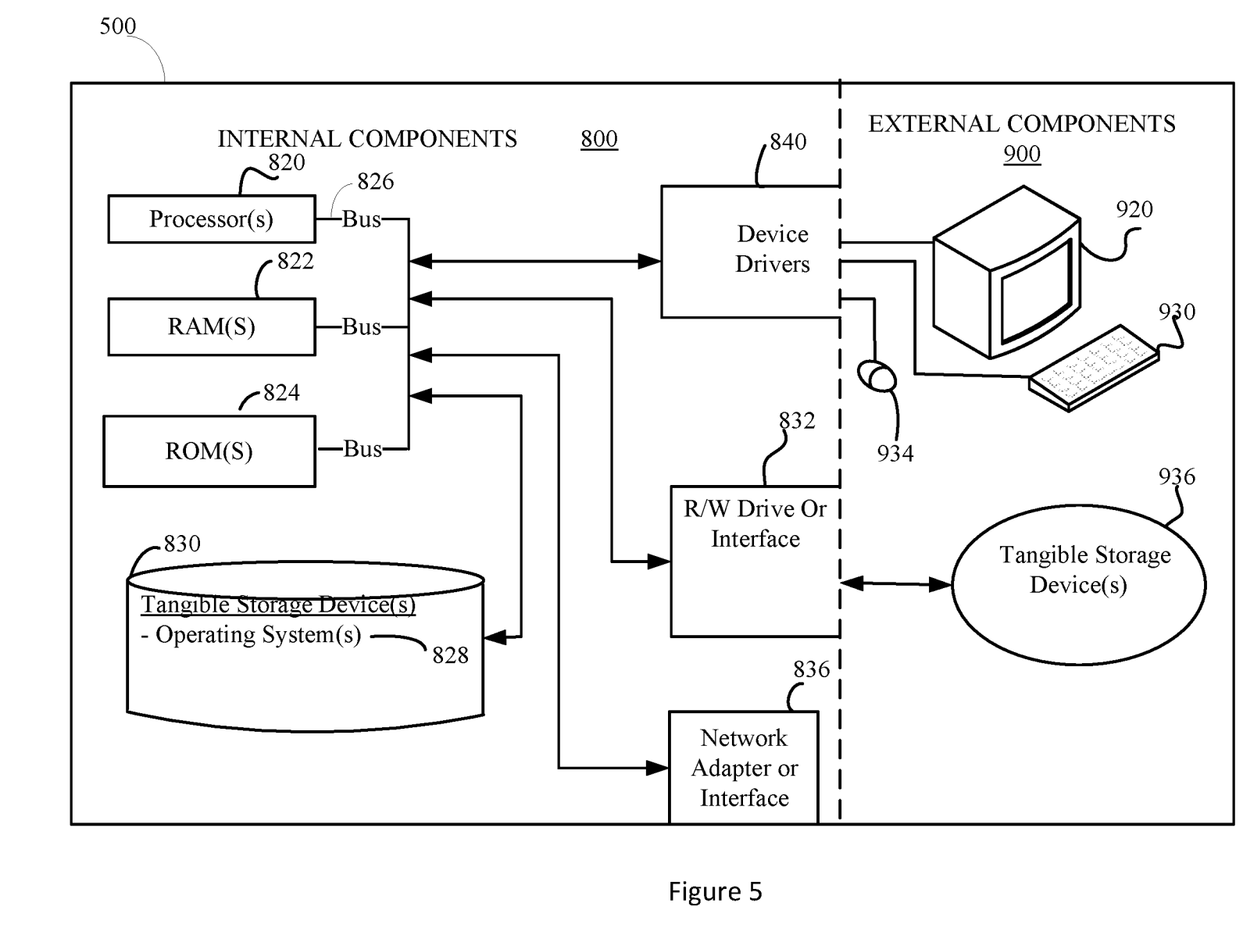
FIG. 5 is a schematic block diagram of hardware and software of the computer environment according to an embodiment of the method of FIGS. 3 and 4.

Referring now to FIG. 5, computing device 500 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the method of FIGS. 3-4; and one or more computer-readable tangible storage devices 830. The one or more operating systems 828 (including the additional data collection facility) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 500, can be downloaded to computing device 500 from an external computer (e.g., server) via a network (for example, the Internet, a local area network, or other wide area network) and respective network adapters or interfaces 836. From the network adapters (or switch port adapters) or interfaces 836 and operating system 828 associated with computing device 500 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824). Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for undoing a point-in-time copy restore, comprising:
    swapping corresponding tracks between a source volume and a target volume using cache of a storage subsystem, based on an indicator being set that a track on the source volume is changed since a point-in-time copy, wherein a host and the point-in-time copy restore synchronize simultaneous access to the track using a track lock on track access, and wherein a requestor without the track lock is queued until the track lock is available; and
    moving the track from the source volume to the target volume based on the indicator being unset.

2. The method of claim 1, further comprising:
    detecting that a host issued a write operation to the source volume track during the restore, wherein the source volume track is waiting to be copied to the target volume;
    moving the track from the source volume to the target volume;
    completing the host write operation to the track on the source volume; and
    canceling a request to transfer the track from the source volume to the target volume.

3. The method of claim 1, further comprising:
    detecting that a host issued a write operation to the source volume track, wherein the source volume track has been copied to the target volume, and the source track requires swapping with the corresponding track on the target volume;
    blocking the host write operation to the source volume;
    transferring the track from the source volume to the target volume; and
    completing the host write operation to the track on the source volume.

4. The method of claim 1, wherein swapping volume identifiers between the source volume and the target volume reverses the point-in-time copy restore, wherein the target volume appears to the host as the source volume at a point when the restore was performed.

5. The method of claim 1, wherein a change recording bitmap tracks the indicator for each track on the source volume.

6. A computer program product for undoing a point-in-time copy restore, comprising program instructions embodied on a non-transitory computer readable storage medium, the program instructions executable by a processor to perform a method comprising:
    swapping corresponding tracks between a source volume and a target volume using cache of a storage subsystem to which the source and the target volumes are attached, based on an indicator being set that a track on the source volume is changed since a point-in-time copy, wherein a host and the point-in-time copy restore synchronize simultaneous access to the track using a track lock on track access, and wherein a requestor without the track lock is queued until the track lock is available; and
    moving the track from the source volume to the target volume based on the indicator being unset.

7. The computer program product of claim 6, further comprising:
    detecting that a host issued a write operation to the source volume track during the restore, wherein the source volume track is waiting to be copied to the target volume;
    moving the track from the source volume to the target volume;
    completing the host write operation to the track on the source volume; and
    canceling a request to transfer the track from the source volume to the target volume.

8. The computer program product of claim 6, further comprising:
    detecting that a host issued a write operation to the source volume track, wherein the source volume track has been copied to the target volume, and the source track requires swapping with the corresponding track on the target volume;
    blocking the host write operation to the source volume;
    transferring the track from the source volume to the target volume; and
    completing the host write operation to the track on the source volume.

9. The computer program product of claim 6, wherein swapping volume identifiers between the source volume and the target volume reverses the point-in-time copy restore, wherein the target volume appears to the host as the source volume at a point when the restore was performed.

10. The computer program product of claim 6, wherein a change recording bitmap includes the indicator for each track on the source volume.

11. The computer program product of claim 6, wherein at completion the source volume includes the tracks from when the point-in-time copy was established and data written from the host since the start of the restore.

12. A computer system for undoing a point-in-time copy restore comprising:
    one or more processors, one or more tangible computer-readable storage devices, and a plurality of program instructions stored on at least one of the one or more tangible computer-readable storage devices for execution by at least one of the one or more processors, the plurality of program instructions comprising:
    swapping corresponding tracks between a source volume and a target volume using cache of a storage subsystem to which the source and the target volumes are attached, based on an indicator being set that a track on the source volume is changed since a point-in-time copy, wherein a host and the point-in-time copy restore synchronize simultaneous access to the track using a track lock on track access, and wherein a requestor without the track lock is queued until the track lock is available; and moving the track from the source volume to the target volume based on the indicator being unset.

13. The computer system of claim 12, further comprising:

detecting that a host issued a write operation to the source volume track during the restore, wherein the source volume track is waiting to be copied to the target volume;

moving the track from the source volume to the target volume;

completing the host write operation to the track on the source volume; and canceling a request to transfer the track from the source volume to the target volume.

14. The computer system of claim 12, wherein swapping volume identifiers between the source volume and the target volume reverses the point-in-time copy restore, wherein the target volume appears to the host as the source volume at a point when the restore was performed.

15. The computer system of claim 12, wherein a change recording bitmap tracks the indicator for each track on the source volume.

16. The computer system of claim 12, wherein at completion the source volume includes the tracks from when the point-in-time copy was established and data written from the host since the start of the restore.

17. The computer system of claim 12, wherein the restore is a background process that is transparent to the host.

* * * * *